INVENTOR
LEE HARRISON III
BY Kingsland, Rogers, Ezell, Eilers & Robbins
ATTORNEYS INVENTOR:
LEE HARRISON III
BY Kingsland, Rogers, Ezell, Eilers & Robbins
ATTORNEYS 3,441,789

MEANS AND METHOD FOR GENERATING SHADOWS AND SHADING FOR AN ELECTRONICALLY GENERATED DISPLAY

Lee Harrison III, 8343 E. Briarwood Place, Englewood, Colo. 80110

Continuation-in-part of application Ser. No. 607,078, Jan. 3, 1967. This application Jan. 12, 1968, Ser. No. 697,456
Int. Cl. H01j 29/70
U.S. Cl. 315—18 14 Claims

ABSTRACT OF THE DISCLOSURE

A network for generating voltages for modulating the intensity of the beam of a display oscilloscope which itself is programmed by an electronic image generator. The electronic image generator produces X, Y and Z voltages corresponding to the continuous loci of all points of a three-dimensional subject. In one embodiment of the invention, these voltages are resolved into two sets of horizontal and vertical deflection voltages which are simultaneously fed to first and second scanning devices. The first scanning device has an output which modulates the intensity of the display beam to prevent overlap of parts of the display subject. The other scanning device has an output that modulates the intensity of the display beam according to shading produced by a light source viewing the display subject from the point of view of the light source. In another embodiment, overlap modulating voltages are stored in a first scan converter and shadow modulating voltages are stored in a second scan converter. On alternate display frames, the electronic image generator is sequenced in an order determined by the viewer's point of view and in an order determined by the light source point of view. In one frame, the voltages from the overlap prevention scanning device are combined with the stored shadow modulating voltages to modulate the beam of the display scope. In the next frame, the voltages from the stored overlap prevention storage device are combined with the generator shadow modulating voltages to modulate the beam of the display scope.

*Cross references to related applications*

This is a continuation-in-part of Lee Harrison III application Ser. No. 607,078, filed Jan. 3, 1967, now U.S. Patent No. 3,364,382, which is a continuation of application Ser. No. 240,970, filed Nov. 29, 1962, now abandoned.

*Brief description of the invention*

The aforesaid Lee Harrison III application describes the generation of electronic images and includes a description of overlap prevention by use of a vidicon tube. In order for overlap information generated by detection of the vidicon white-level-change outputs to be appropriate, the elements of the display subject in the picture volume must be drawn (in any one frame) in a sequence which requires drawing those elements closest to the observer first and thereafter in sequence back into the picture volume (away from the viewer). Shadow generation uses this same overlap prevention approach.

The light source which creates shadows is determined by "point of view" from which the scene is "seen" by the light source. To make the vidicon detection network effective as applied to shadow generation, sequencing requires drawing back into the picture volume from the "point of view" of the light source.

The points of view of the observer and the light source may be the same for some applications and be different for other applications. If these points of view are the same, then the overlap prevention sequencing is suitable for shadow generation, too. If they are not the same, then the picture must be drawn separately from two points of view, in alternating sequences so that in one sequence overlap information can be stored and in the other sequence shadow information can be stored. In the first sequence, generated shadow information is used directly with stored overlap information to modulate the intensity of the display, and vice versa. This avoids the higher expense of providing two separate electronic image generators programed in separate sequences to generate shadow and overlap signals. In one embodiment of this invention, the separate sequencing from the two points of view are time-shared and stored so that in each frame of the electronically generated image, overlap prevention sequenced from the viewer's point of view and shadow generation sequenced from the light source point of view are available.

Since overlap prevention information and shadow information are each stored in the same general format as described in the aforesaid Lee Harrison III application, namely that information describing the display subject in three dimensions is resolved into two-dimensional information for controlling the two-dimensional display, a scan converting-storage device can be used. Thus, three-dimensional overlap prevention information is generated in its proper sequence, resolved into two-dimensional information, and stored, thereafter to be read in a different sequence. Likewise, three-dimensional shadow information is generated in its proper sequence, resolved into two-dimensional information, and stored, thereafter to be read in a different sequence.

In one embodiment of this invention, an electronic image generator of the kind set forth in the aforesaid Lee Harrison III application generates X, Y and Z voltages corresponding to the three-dimensional coordinates of a display subject. These X, Y and Z voltages are fed simultaneously to two sine-cosine rotational transforms. One of the rotational transforms is set to produce horizontal and vertical deflection voltages corresponding to a two-dimensional view of the display subject in a plane normal to the viewer's point of view, and these horizontal and vertical deflection voltages control the horizontal and vertical deflections of the beam of a display oscilloscope. The other sine-cosine rotational transform generates horizontal and vertical deflection voltages corresponding to a two-dimensional view of the display subject from the point of view of the light source that is to produce shading. These horizontal and vertical deflection voltages program the scanning of an overlap prevention device that has an output of a variable voltage according to whether or not the scanning device scans areas it has previously scanned during a single frame. By modulating these voltages, the beam of the display oscilloscope can be modulated to produce shadows determined by the point of view of the light source. While the modulating voltages corresponding to shadow information are being produced, voltages to blank and unblank the beam of the display oscilloscope are simultaneously being produced in an overlap prevention scanning device that is programmed to scan parallel to the beam of the display oscilloscope. The output from the overlap prevention scanning device modulates the intensity of the beam of the display oscilloscope to turn off the beam whenever it moves over areas over which it has previously moved during a single frame, thereby preventing overlap. Whenever the beam of the display oscilloscope is not turned off, its intensity is modulated by the variable voltages corresponding to shadows.

In a second embodiment of the invention, the electronic image generator produces voltages corresponding to the X, Y and Z components of the display subject.

However, since for some points of view of the light source, the sequence of drawing the display subject in the shadow generator scanning device must be different from the sequence of the overlap prevention device from the viewer's point of view, the electronic image generator must be separately sequenced for each. Accordingly, the image generator is sequenced from the viewer's point of view and alternatively from the light source point of view, the sequence changing for each frame.

During the sequence of generating X, Y and Z component voltages from the viewer's point of view, a rotational transform delivers horizontal and vertical deflection voltages in parallel to the overlap prevention scanning device and to the display oscilloscope. The output from the overlap prevention scanning device, however, is fed not only to the display oscilloscope, but also to a scan converter device which stores the variable voltages representing overlap prevention. The scan converter device is scanned according to a program produced by a scanner assembly corresponding to a skin scanner network in the aforesaid Lee Harrison III application. While the display oscilloscope is drawing the display subject on its face, its beam is modulated in intensity not only by the signal from the overlap prevention device, but also from intensity modulating signals from another storage scan converter device.

The intensity varying signals in the last-mentioned storage scan converter device were stored from the preceding frame when they were produced by a shadow generating scanner. The shadow generating scanner is programmed by horizontal and vertical deflection voltages produced by a rotational transform set to the point of view of the light source and operable to convert the X, Y and Z voltages during operation of the electronic image generator in the sequence of the sequence control from the light source point of view. The storage scan converter device that stores shadow intensity modulation voltages is also programmed according to the scanner assembly corresponding to the skin scanner network of the Lee Harrison III application.

During operation of the electronic image generator in the sequence required by the light source point of view, the display beam is modulated in intensity by the stored overlap prevention voltages and by the shadow modulating voltages directly produced during that frame by the shadow generating scanning device.

Figures 1, 3, 4, 5, 6:
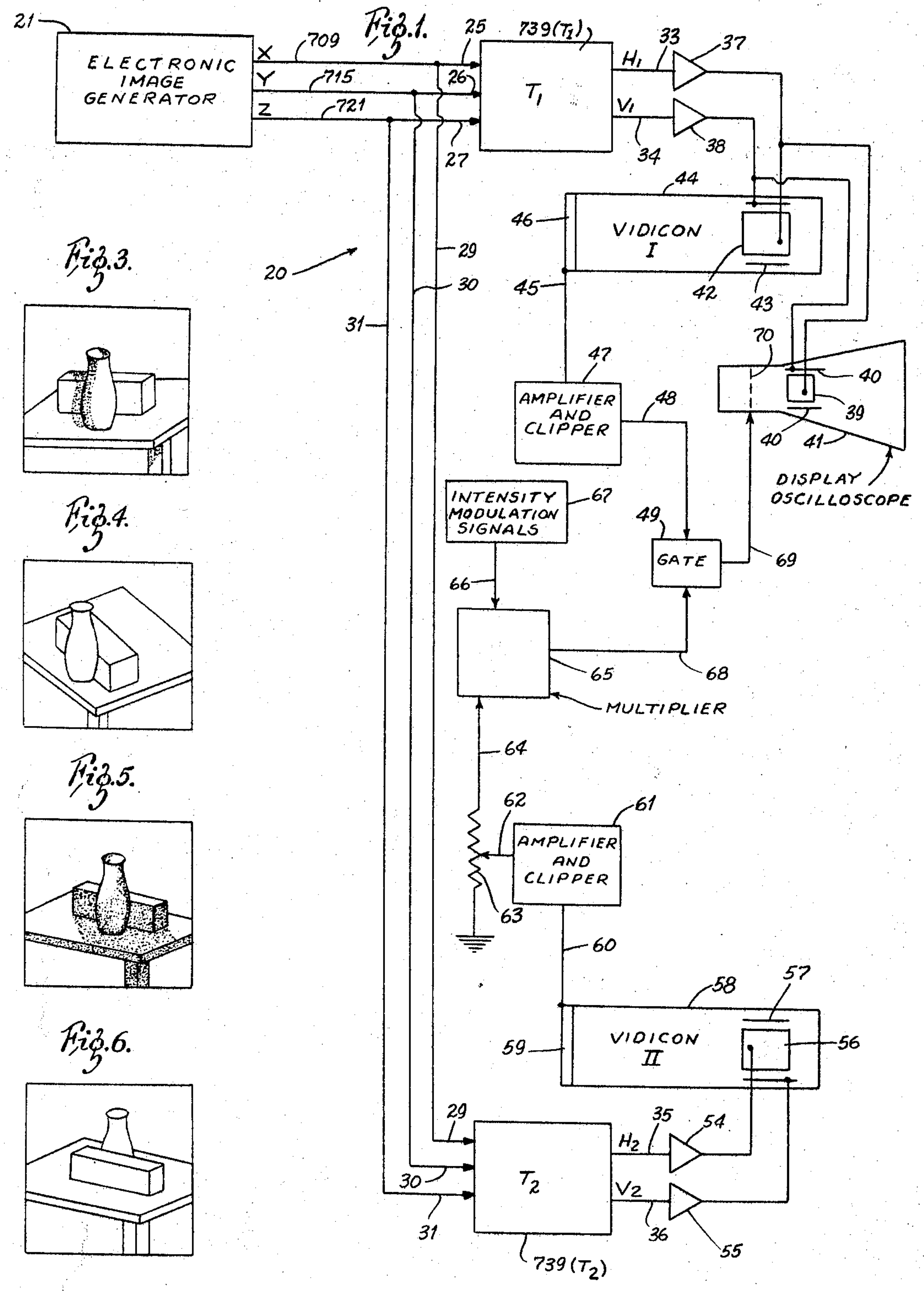
FIGURE 1 is a schematic diagram of the system for generating shadow signals usable when the direction of the light source is such that the sequencing required for overlap prevention is the same as that required for shadow generation.
FIGURE 3 is a representative view of an image on the display oscilloscope with shading of display objects by the system of FIGURE 1.
FIGURE 4 is a representative view of the display of FIGURE 3, but viewed from the point of view of the light source.
FIGURE 5 is a representative view of an image on the display oscilloscope with shading of display objects by the system of FIGURE 2.
FIGURE 6 is a representative view of the display of FIGURE 5, but viewed from the point of view of the light source.

*Detailed description of the shadow generator of FIGURE 1*

Referring to FIGURE 1, the shadow generating system 20 is used with an electronic image generator 21 that has output conductors 709, 715 and 721 carrying voltages corresponding at a given instant to the X, Y and Z components, respectively, of a point in three-dimensional space defined by three-dimensional coordinates X, Y and Z. The electronic image generator may be a system as generally set forth in an invention of Lee Harrison III as set forth in U.S. Patent No. 3,364,382. Reference to the aforesaid patent of Lee Harrison III shows that there are electrical signals representing or corresponding to mathematical values of the X, Y and components of a point in three-dimensional space fed by conductors 709, 715 and 721 to a camera angle network 739. These are the kinds of voltages or signals that constitute the outputs 709, 715 and 721 of FIGURE 1.

The X, Y and Z output signals are supplied to imputs 25, 26 and 27 to a first sine-cosine rotational transform system 739 ($T_1$), and by input conductors 29, 30 and 31 to a second sine-cosine rotational transform system 739 ($T_2$). Each of the rotational transform systems 739 ($T_1$) and 739 ($T_2$) performs the function described by the camera angle network 739 of the aforesaid Lee Harrison III patent. In this application, however, the first rotational transform system 739 ($T_1$) performs the same function as the camera angle network of the Lee Harrison III patent in that it resolves the X, Y and Z inputs 25, 26 and 27 into voltage output signals 33 and 34 representing the horizontal and vertical components of the point in the two dimensions of a plane normal to the viewer's point of view. For example, for a display vase and block resting on a table, the horizontal and vertical deflection components for all points of the display might be oriented by the transform 739 ($T_1$) to the plane shown.

The other rotational transform system 739 ($T_1$) similarly resolves the three-dimension input signals 29, 30 and 31 into two-dimensional components, but the output signals 35 and 36 from the rotational transform system 739 ($T_2$) are proportional to the horizontal and vertical deflection components in a plane normal to the point of view of the light source that creates shadow or shade. For example, the plane of viewing the display subject as illustrated in FIGURE 4 might be the plane of viewing the objects of FIGURE 3 with the plane of FIGURE 4 being established by the horizontal and vertical deflection components of the rotational transform 739 ($T_2$).

The output signals 33 and 34 from the first rotational transform system 739 ($T_1$) are fed through amplifiers 37 and 38 both to the horizontal and vertical deflection plates 39 and 40 of a display oscilloscope 41 and to the horizontal and vertical deflection plates 42 and 43 of an overlap prevention device that may comprise a vidicon tube 44. The display oscilloscope 41 corresponds to the display tube 11 and the vidicon tube 44 corresponds to the vidicon tube 846 of the aforesaid Lee Harrison III patent.

The vidicon tube 44 has an output 45 carrying a voltage only when the beam of the vidicon tube 44 moves across areas of its face 46 not previously traversed by the beam as the vidicon tube beam moves parallel to the beam of the display oscilloscope 41. The output signals from the vidicon tube 44 are carried by the conductor 45 through an amplifier and clipper 47 and by another conductor 48 to a gate 49 to open the gate 49 only when the conductor 48 carries an output signal from the vidicon tube 44.

The output signals 35 and 36 from the second rotational transform system 739 ($T_2$) are fed through amplifiers 54 and 55 to the horizontal and vertical deflection plates 56 and 57 of another overlap prevention device, which may also be a vidicon tube 58. The beam of the vidicon tube 58 also moves across its face 59 as the object or figure is being drawn on the display oscilloscope 41 but, in this case, the beam moves according to the horizontal and vertical deflection signals in the output conductors 35 and 36 established by the selected point of view of the light source in the rotational transform 739 ($T_2$). This vidicon tube beam generates an output voltage whenever it scans areas on its face which have not been drawn upon during the frame and generates a relatively different voltage when it scans areas that it has previously scanned. (A suitable device, such as a flasher, recharges the vidicon tube between each frame, in the manner described in the Lee Harrison III patent.) Since the vidicon tube 58 thus has a detectable output that varies according to parts of objects behind parts of other objects and according to sides of objects that are obscured from the point of view of the light source as determined by the rotational transform 739 ($T_2$), the variable output from the vidicon tube 58 can be used to modulate the intensity of the oscilloscope beam to create shadows. The locations of these shadows will depend upon the relationships between the relative points of view determined by the rotational transforms 739 ($T_1$) and 739 ($T_2$).

The output from the vidicon tube 58 is fed by a conductor 60 to an amplifier and clipper 61. The output conductor 62 from the amplifier and clipper 61 carries a voltage corresponding to scanning of the beam of the vidicon tube 58 over previously unscanned areas of the face 59 and a different voltage corresponding to scanning of the beam over areas of the face 59 that have been previously scanned.

The output conductor 62 is connected to variable voltage attenuator 63 that is set to produce an output voltage within the value range of zero to one (proportioned to the input voltage). Ordinarily, the voltage output from the variable voltage attenuator would correspond to a value of one for the voltages produced when the vidicon tube beam scans previously unscanned territory with the output voltage from the variable voltage attenuator being at some selected value of less than 1 for the voltages corresponding to scanning of previously scanned territory by the beam of the vidicon tube 58. These output voltages from the variable voltage attenuator 63 are fed by a conductor 64 to a multiplier 65.

There is another input 66 to the multiplier 65 leading from a generator 67 of variable voltages for modulating the intensity of the display objects or figures. The input 66 carries a voltage corresponding to the gross intensity of the object or figure being displayed. This gross intensity signal input 66 may be one or a combination of several intensity signals such as the intensity modulating signal 896 delivered to the display tube 11, the differentiated intensity modulating signal delivered by the conductor 904 to the display tube 11 as described in the aforementioned Lee Harrison III patent, or any other source of intensity modulation signals. This gross intensity signal 66 is continuously modified or modulated by being multiplied by the intensity signal 64 to the multiplier 65. Since the value of the input 64 is always correspondent to voltages between zero and one, the effect of multiplying the input signal 64 by the gross intensity signal 66 is always to maintain the value of gross intensity (as when the input signal 64 corresponds to a value of 1) or to reduce the intensity signal (when the input signal 64 corresponds to a value of less than 1). The output from the multiplier 65 is fed through a conductor 68 to the gate 49 that has been described.

The gate 49 is held open whenever there is a signal in the conductor 48 to pass the input signal on conductor 68. An output conductor 69 from the gate 49 delivers the voltage to an intensity modulation and blanking grid 70 of the display oscilloscope 41.

*Operation of the shadow generator system of FIGURE 1*

The electronic image generator 21 produces voltages in the conductors 709, 715 and 721 corresponding to the X, Y and Z components of the display subject. The X, Y and Z components are resolved into horizontal and vertical deflection components by the rotational transform 739 ($T_1$) which are fed simultaneously to the overlap prevention device 44 and to the display oscilloscope 41. The rotational transform 739 ($T_1$) can be adjusted to produce any desired viewing angle of the display subject, as described in the aforesaid Lee Harrison III patent, such as is shown in FIGURE 3.

At the same time and in the same sequence as the image deflection voltages are generated from the rotational transform 739 ($T_1$), other horizontal and vertical deflection voltages are generated in the second rotational transform 739 ($T_2$), utilizing the same X, Y and Z voltages from the conductors 709, 715 and 721. However, the rotational transform 739 ($T_2$) is set according to the point of view of the light source corresponding to the shading desired by the operator to produce horizontal and vertical deflection voltages different from those produced by the transform 739 ($T_1$). These horizontal and vertical deflection voltages are delivered to the shading vidicon tube 58 which operates like the overlap prevention vidicon tube 44, except that its output is proportional to a desired dimming of the display beam for shading, rather than complete blanking or unblanking as for overlap prevention.

The output voltages from the vidicon tube 58 are attenuated to values between zero and one and are multiplied by other intensity modulating signals coming from the intensity modulator generator 67, and the resulting voltages are fed to the intensity grid 70 of the display oscilloscope. Therefore, as the beam of the display oscilloscope 41 draws the display of FIGURE 3, shading is produced as there shown because the rotational transform 739 ($T_2$) generates horizontal and vertical deflection voltages to the vidicon tube 58 corresponding to a selected light source viewing angle, as illustrated in FIGURE 4, and produces the appropriate attenuation signals for those portions of the subject which are behind other portions as "seen" from the viewpoint of the light source.

Figure 2:
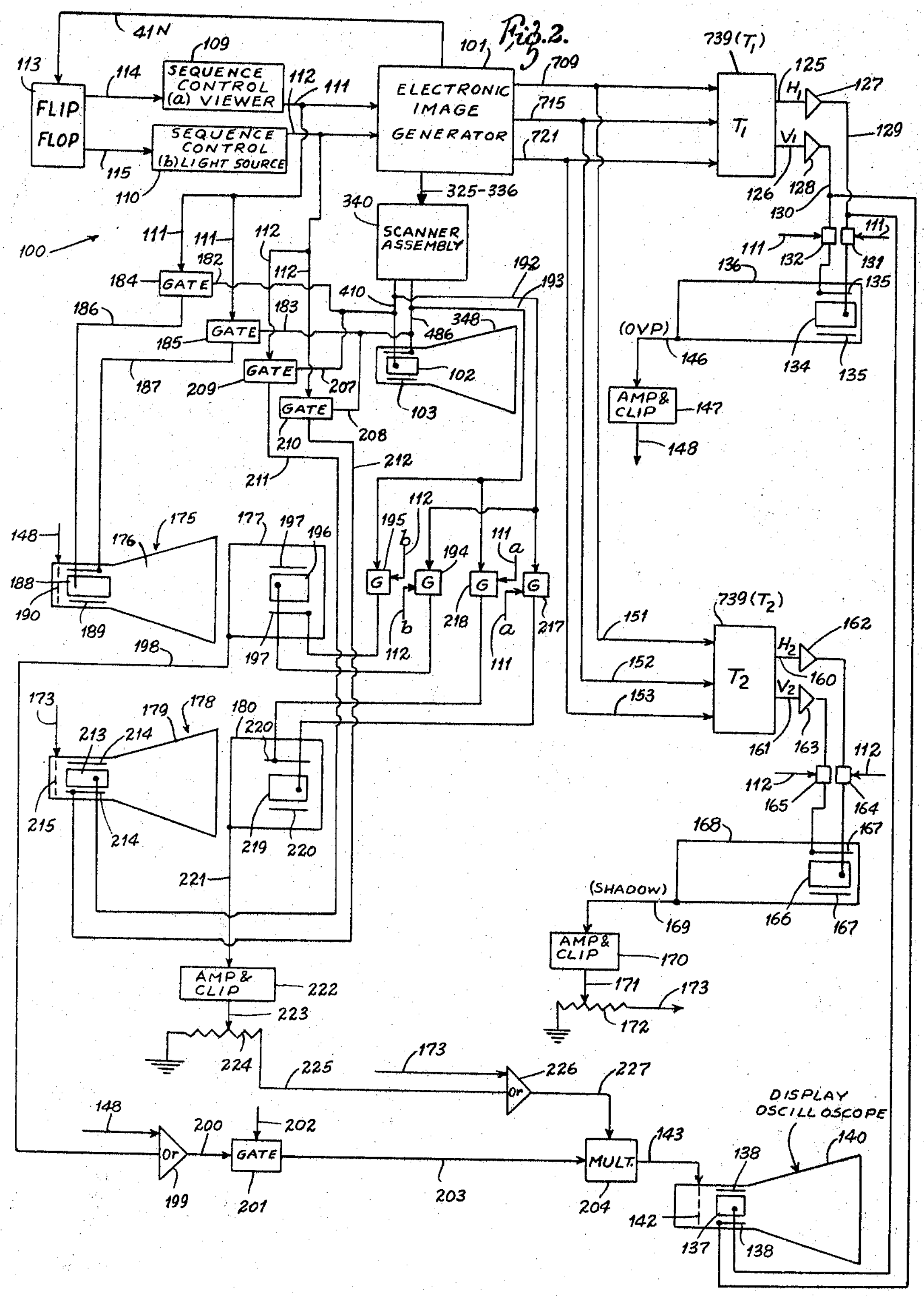
FIGURE 2 is a schematic diagram for the system for generating shadow signals usable with unlimited positions of the light source, in which independent sequencing of input signals for the shadow generator system is employed.

*Detailed description of the shadow generator of FIGURE 2*

The shadow generator of FIGURE 1 is satisfactory for those applications in which the point of view of the light source is in the same general azimuth as the point of view of the viewer. Stated another way, the FIGURE 1 generator works when the sequence for drawing the display objects as required for proper operation of the overlap prevention device 44 can be the same for the shadow signal generating vidicon 58. However, this system will produce shadow inaccuracies for other points of view of the light source from which the light source "views" or "sees" sides of the objects of the display not viewed or seen by the viewer or views multiple objects (as determined by the rotational transform 739 ($T_1$)) in a different front-to-back sequence from that of the viewer (as determined by the rotational transform 739 ($T_2$)).

Referring to FIGURE 2, the shadow generator system 100 for unlimited light source positions incorporates an electronic image generator 101 of the kind described in the aforesaid Lee Harrison III application. As described in that application, the electronic image generator 101 includes a scanner assembly 340 having output conductors 410 and 486 leading to the horizontal and vertical deflection plates, respectively, of a cathode ray tube 348. These horizontal and vertical deflection plates may be indicated by the reference characters 102 and 103, respectively. The Lee Harrison III patent describes how the cathode ray tube 348 scans a skin film for producing modulations of a voltage proportional to distances of surfaces of a figure or object from its central axis, and the scanner assembly 340 programs the movement of the beam of the cathode ray tube 348 so that the voltages proportional to these skin distance vectors will always be synchronized with the voltages proportional to the axes of the members or objects. The horizontal and vertical deflection signals carried by these conductors 410 and 486, or similar deflection voltage signals programming the generation of voltages corresponding to points on the surface of the figure or object, are used for the shadow generator 100. Also, voltages representing the three-dimensional position of the figure or object relative to three-dimensional coordinates, such as the voltages produced in the conductors 709, 715 and 721 as described in the said Lee Harrison III patent (the output voltages from the integrators corresponding to X, Y and Z components of the object or figure) are used.

The present shadow generating system requires that the generation of the X, Y and Z components represented by voltages in the output conductors 709, 715 and 721 be done in two independent sequences. Any suitable sequence controls 109 and 110 may be provided for accomplishing this, the sequence controls 109 and 110 having two outputs 111 and 112. One output 111 sequences the generation of X, Y and Z component voltages in the electronic image generator 101 in the proper order from the viewer's point of view (the viewer being the person looking at the ultimate display on a display oscilloscope). The other output 112 sequences the generation of voltages for the members of the display in the proper order from the point of view of the light source that is to establish shadows and shading on the final display. Each of the sequencing controls 109 and 110 may be similar to the sequence control of the aforesaid Lee Harrison III patent wherein a plurality of step counters 46–50N which establish lengths of display members are connected in a predetermined sequence for firing and thus opening their respective parameter gates, or by some equivalent means, or by "Means And Methods For Semi-Automatically Sequencing The Generation of Components For An Electronic Image Display," described and illustrated in an application of Lee Harrison III filed, Ser. No. 697,512, filed Jan. 12, 1968, or by any other suitable sequencing arrangement.

The sequencing controls 109 and 110 may be identical and they are controlled by any suitable device, such as a flip-flop or toggle 113, which is toggled by a pulse between frames of the generated image, such as by the frame pulse in the conductor 41N of the aforesaid Lee Harrison III patent. The toggle 113 alternatively causes the sequence controls 109 and 110 to function by respective inputs 114 and 115. The output conductors 111 and 112 from the sequence controls 109 and 110 represent a plurality of control or steering signals which define and control the sequence of drawing of individual segments of the display subject.

The voltages representing the X, Y and Z components of the figure are delivered by the conductors 709, 715 and 721 to a sine-cosine rotational transform 739 ($T_1$) that may be like the sine-cosine rotational transform referred to as a camera angle network 739 in the aforesaid Lee Harrison III patent and like the transform 739 ($T_1$) in FIGURE 1.

The sine-cosine rotational transform 739 ($T_1$) resolves the voltage representing the X, Y and Z coordinates of the displayed subject into voltages representing the horizontal and vertical deflections of the display subject on the face of the display tube. These horizontal and vertical deflection voltages are delivered from the rotational transform 739 ($T_1$) by a pair of conductors 125 and 126 to a pair of suitable amplifiers 127 and 128 having output conductors 129 and 130 carrying amplifications of the horizontal and vertical deflection voltages.

The horizontal and vertical deflection voltages carried by the conductors 129 and 130 are delivered simultaneously through a pair of gates 131 and 132 to the horizontal and vertical deflection plates 134 and 135 of an overlap prevention device in the form of a vidicon tube 136 (which may be like the vidicon tube 44 of FIGURE 1) and to the horizontal and vertical deflection plates 137 and 138 of a display tube or oscilloscope 140 that corresponds to the display tube 11 of the aforesaid Lee Harrison III patent. The gates 131 and 132 are opened to pass signals to the vidicon tube 136 whenever there are voltage signals in the output conductor 111 from the sequence control 109.

The display oscilloscope 140 has a beam intensity grid 142 to which a variable voltage input is supplied by a conductor 143. The variable voltage carried by the conductor 143 modulates the intensity of the beam of the display oscilloscope 140. For only overlap prevention and gross intensity modulation (without shadow generation), the voltage carried by the conductor 143 would be the output from the vidicon tube 136 combined with intensity modulations as described in the aforesaid Lee Harrison III patent. However, according to the present invention, the intensity of the display beam is automatically further modulated according to variable voltages representing shadows and shading for the displayed image.

The vidicon tube 136 has an output conductor 146 that carries a voltage whenever the beam of the vidicon tube 136 scans portions of its face that it has not previously scanned during a single frame and carries no voltage when its beam scans areas previously scanned. The output from the vidicon tube 136 is delivered to an amplifier and clipper 147 having an output conductor 148.

The conductors 709, 715 and 721 carrying the voltages representing X, Y and Z components of the displayed subject are also connected by other conductors 151, 152 and 153 to another sine-cosine rotational transform 739 ($T_2$) which may be like the rotational transform 739 ($T_1$).

The rotational transform 739 ($T_2$) is ordinarily the same as the rotational transform 739 ($T_1$). However, the rotational transform 739 ($T_2$) is set to resolve its three-dimensional input voltages into voltages corresponding to horizontal and vertical deflection voltages in a plane normal to the axis leading from the light source that creates the shadow or shading.

These horizontal and vertical deflection voltages generated by the rotational transform 739 ($T_2$) are delivered by output conductors 160 and 161 through a pair of suitable amplifiers 162 and 163 and a pair of gates 164 and 165 to the horizontal and vertical deflection plates 166 and 167 of a vidicon tube 168. The vidicon tube 168 is similar to the vidicon tube 58 of FIGURE 1. It has an output conductor 169 that caries a predetermined voltage generated when the beam of the vidicon tube 168 scans previously unscanned areas of its face, and a different voltage output when the beam scans areas that it has previously scanned. A suitable device (not shown) such as a flasher recharges the face of the vidicon between frames drawn. The output conductor 169 is connected to an amplifier and clipper 170 having an output conductor 171 connected to a variable voltage attenuator 172. The variable voltage attenuator 172 is set to produce a voltage in its output conductor 173 that is between values of zero and 1 with respect to the input.

For the storage of overlap information, there is a random access scanning device 175 comprising a write tube 176, such as an oscilloscope, and a read tube 177, such as a vidicon tube. For storage of intensity modulating information, there is another random access scanning device 178 comprising a write tube, such as an oscilloscope 179 and a read tube, such as a vidicon tube 180. These random access scanning devices 175 and 178 are programmed as will now be described.

The programmed horizontal and vertical deflection voltages in the conductors 410 and 486 are delivered by a pair of conductors 182 and 183 to a pair of gates 184 and 185 that, when opened, pass the voltages to a pair of conductors 186 and 187 connected to the horizontal and vertical deflection plates 188 and 189 of the write tube 176. The gates 184 and 185 are opened when there are sequencing signals in the conductor 111. At the same time, the conductor 148 from the output of the overlap prevention device 136 is connected to the intensity grid 190 of the write tube 176 to modulate the intensity of the beam as the programmed scanning takes place on the face of the tube 176. While the beam of the tube 176 scans its face, it writes charges on the face of the vidicon tube 177 according to the scanning pattern determined by the horizontal and vertical deflection voltages produced by the scanner assembly 340 and according to the blanking or unblanking of the beam of the tube 176 as determined by the output 148 from the overlap prevention device 136. The scanner assembly 340, of course, is always programmed in relation to the sequence of operation of the electronic image generator 101.

The conductors 410 and 486 are also connected by a pair of conductors 192 and 193 through a pair of gates 194 and 195 to the horizontal and vertical deflection plates 196 and 197 of the read tube 177. The gates 194 and 195 are opened by the presence of sequencing signals in the conductor 112 as indicated. Thus, during operation of the sequence control 110, the read tube 177 is caused to scan its face in the pattern programmed by the horizontal and vertical deflection voltages generated by the scanner assembly 340.

An output conductor 198 from the read tube 177 carries voltages that are modulated such that a voltage is present or absent according to the blanking and unblanking voltages programmed by the conductor 148 to the intensity grid 190 of the write tube 176.

The conductor 198 is connected to an "or" gate 199. The other input to the "or" gate is the output 148 from the overlap prevention device 136. The output conductor 200 from the "or" gate 199 is connected to open or close a gate 201. The input to the gate 201 contains voltages corresponding to any intensity modulations (gross intensity) that might be generated other than by the present invention, such as by methods described in the aforesaid Lee Harrison III patent or by other methods. Whenever the gate 201 is opened by the presence of voltages in the conductor 200, the gross intensity input conductor 202 passes its voltage signal to a conductor 203 that leads to a multiplier 204.

To program the write tube 179 of the scan converter 178, the output conductors 410 and 486 are connected by a pair of conductors 207 and 208 to a pair of gates 209 and 210 having output conductors 211 and 212 connected to the horizontal and vertical deflection plates 213 and 214 of the write tube 179. Also, the output 173 from the vidicon tube 168 is connected to the intensity grid 215 of the tube 179 to modulate the beam as it undergoes its programmed scanning. The gates 209 and 210 are opened whenever there is a signal in the conductor 112 on the output side of the sequence control 110.

The output conductors 410 and 486 from the scanner assembly 340 are also connected by the conductors 192 and 193 through another pair of gates 217 and 218 to the horizontal and vertical deflection plates 219 and 220 of the read tube 180. The gates 217 and 218 are opened whenever there is a sequence signal in the output conductor 111 from the sequence control 109. An output conductor 221 from the read tube 180 is connected to an amplifier and clipper 222 that has an output 223 connected to a variable voltage attenuator 224. The variable voltage attenuator 224 is set to produce voltage values identical to those set for the output from the vidicon tube 168 by the voltage attenuator 172.

The output from the voltage attenuator 224 is delivered by a conductor 225 to an "or" gate 226. The other input to the "or" gate 226 is the output from the variable voltage attenuator 172 as delivered by the conductor 173. An output conductor 227 from the "or" gate 226 is connected to the multiplier 204 for multiplication of its voltages by the voltages carried by the other conductor 203 connected to the multiplier 204. The output from the multiplier 204 is connected to the conductor 143 that delivers voltages to the intensity grid 142 of the display oscilloscope 140 to modulate the intensity of the display beam.

*Operation of the shadow generator of FIGURE 2*

The shadow generator of FIGURE 2 is capable of producing shading for a display viewed as illustrated in FIGURE 5, wherein the point of view of the light source may be from any angle relative to the subject of the display, such as is illustrated in FIGURE 6. In this system, there are parallel generations of images from the electronic image generator 101. First the X, Y and Z components of the displayed subject are produced in the conductors 709, 715 and 721 in the sequence set by the sequence control 109. Second, the X, Y and Z components are generated in the sequence set by the sequence control 110. These sequence controls 109 and 110 are operated alternatively with every frame as controlled by the toggle 113 operated at the end of each frame by a frame pulse in the conductor 41N.

Thus, in this shadow generator 100, the electronic image generator alternatively generates voltages representing the X, Y and Z components of the display subject in the sequence from the viewer's point of view and in the sequence from the light source point of view. Each time the X, Y and Z voltages are thus generated, they are resolved into horizontal and vertical deflection voltages by the sine-cosine rotational transforms 739 ($T_1$) and 739 ($T_2$). The horizontal and vertical deflection voltages from the transform 739 ($T_1$) are fed simultaneously to the overlap prevention device 136 and to the display oscilloscope 140, and both of these devices are caused to scan in parallel. The horizontal and vertical deflection voltages from the rotational transform 739 ($T_2$) are fed to the shadow generation device 168.

While the overlap prevention device 136 scans, it produces an amplified and clipped output voltage 148 that is delivered simultaneously to the "or" gate 199, for use in controlling the beam of the display oscilloscope 140, and to the scan conversion device 175 to control the intensity of the beam of the write tube 176. As the overlap prevention device 136 generates variable voltages in the conductor 148 for overlap prevention, those variable voltages are written by the tube 176 on the face of the read tube 177 where they are stored until the next frame (when the electronic image generator 101 is sequenced by the sequence control 110).

As the vidicon tube 168 scans, during operation of the sequence control 110, its attenuated output voltage in the conductor 173 is fed simultaneously to the "or" gate 226 to modulate the intensity of the beam of the display oscilloscope 140 and to the intensity grid 215 of the write tube 179 of the scan conversion device 178. The write tube 179 writes the intensity modulated information on the face of the read tube 180 where it is stored until the next frame (when the electronic image generator is operated by the sequence control 109).

Both the scan converter devices 175 and 178 perform their write and read functions according to the programming of the scanner assembly 340 and at the times regulated by which sequence control 109 or 110 is functioning.

It is now apparent that each time the sequence control 109 operates, X, Y and Z voltages of the display subject are resolved into horizontal and deflection voltages by the rotational transform 739 ($T_1$). The overlap prevention device 136 generates variable voltages corresponding to overlap prevention, the image is drawn on the display oscilloscope according to the horizontal and vertical deflection voltages generated by the transform 739 ($T_1$), and the output from the overlap prevention device is delivered to the write tube 176. At the same time, variable intensity information is written on the face of the read tube 177 according to the program of the scanner assembly 340, and the read tube 180 reads its face according to this same scanning program and produces an attenuated variable voltage output in the conductor 225 corresponding to shadow information stored from the preceding generation of X, Y and Z voltages under the control of the sequence control 110. Since in this sequence, there is no voltage in the conductor 173 from the vidicon tube 168 (because the gates 164 and 165 are not opened to pass voltages to the vidicon tube 168), only the voltages in the conductor 225 are passed to the multiplier 204. Likewise, only the voltage in the conductor 148 leading to the "or" gate 199 is fed to the gate 201 because the read tube 177 in the scan converter device 175 is not functioning (the gates 194 and 195 are not opened to pass programming voltages to the read tube 177 in this sequence).

This variable voltage in the conductor 148 opens or closes the gate 201 to pass gross intensity voltages from the conductor 202 to the multiplier 204. These gross intensity voltages are multiplied by the voltages in the conductor 227 representing shadow information, and the product is fed to modulate the intensity of the display beam of the display oscilloscope 140.

In the next sequence under the control of the sequence control 110, the overlap prevention device 136 is not functional because the gates 131 and 132 do not pass voltages. However, the beam of the display tube 140 is deflected according to the voltages in the conductors 129 and 130. At the same time, the read tube 177 of the scan conversion device 175 scans according to the program dictated by the scanner assembly 340, which is now sequenced by the sequencer control 110, and generates an output in the conductor 198 representing the overlap prevention voltages stored from the preceding frame. This voltage is fed through the "or" gate 199 to the gate 201 (there being no voltage during this sequence in the conductor 148). Also, during this sequence, the vidicon tube 168 scans its face according to the program established by the sequence control 110 and to the deflection voltages generated in the rotational transform 739 ($T_2$). The attenuated output voltages carried by the conductor 173 are delivered to the "or" gate 226 and to the multiplier 204 (during this sequence there is no voltage in the conductor 225 because the gates 217 and 218 are not opened).

The voltages in the conductor 200 control the opening and closing of the gate 201 to pass gross intensity voltages from the conductor 202 to be multiplied by the shadow voltages in the conductor 227 in the multiplier, as before, and the resulting voltages are fed to the grid 142 for modulating the beam of the oscilloscope 140.

I claim:

1. A network for generating signals for modulating the intensity of the beam of a display device of the kind programmed by an electronic image generator comprising means for generating signals corresponding to the horizontal and vertical deflection voltages representing the locus of points on the surface of the display subject as projected on a plane, means for controlling the beam of a display device according to the horizontal and vertical deflection voltages, means for controlling the scanning of a random access memory device according to the horizontal and vertical deflection voltages, the memory device having the characteristic of producing a first output signal when scanning areas of its memory not previously scanned and a second output signal when scanning areas of its memory previously scanned, and means to modulate the intensity of the display device in response to the output from the memory device.

2. The network of claim 1 including a sine-cosine rotational transform, means to generate signals corresponding to three-dimensional coordinates of the points, the horizontal and vertical deflection voltages comprising output signals from the transform.

3. The network of claim 2 including a second sine-cosine rotational transform and a second random access memory device, means for feeding the three-dimensional coordinate voltages into the second transform, means to program the second random access memory device according to selected two-dimensional output voltages from the second transform, and means to modulate the intensity of the beam of the display device according to the outputs of both random access memory devices.

4. The network of claim 3 wherein the output signals from the second random access memory device are proportioned to shadows of the display subject determined by the setting of the second transform.

5. The network of claim 3 including first means to store the output signals from the first memory device, second means to store the output from the second random access memory device, means to alternately read the stored information from the first and second storage means during alternate frames of operation of the image generator and means to alternately transmit signals from the first and second read means to the beam of the display device during alternate frames of display by the display device.

6. A method of modulating the intensity of the beam of a display device of the kind programmed by an electronic image generator comprising the steps of generating signals corresponding to the three-dimensional coordinates of points on the surface of the display subject, resolving the three-dimensional coordinate voltages into two dimensional voltages for controlling the beam of a display device, controlling the scanning of a random access memory device according to the horizontal and vertical deflection voltages and synchronized with the control of the display beam, thereby producing an output from the memory device that varies according to whether the area scanned had been previously scanned, and modulating the intensity of the display beam in response to the output from the memory device.

7. The method of claim 6 including the step of resolving the three-dimensional coordinate voltages into second horizontal and vertical deflection voltages, programming a second random access memory device according to the second horizontal and vertical deflection voltages to produce an output signal modulated according to shadows on the display, and modulating the intensity of the display beam according to the outputs from both memory devices.

8. The method of claim 7 including separately storing the outputs from the memory devices and selectively reading the stored information for controlling the intensity of the display beam.

9. A method of modulating the intensity of the beam of a display device comprising the steps of generating signals for controlling movement of the display beam according to a selected program, controlling the scanning of a random access memory device in predetermined correspondence with the movement of the display beam, thereby producing an output from the memory device that varies according to whether the area scanned has been previously scanned, and modulating the intensity of the display beam in response to the output from the memory device.

10. The method of claim 9 plus the steps of controlling the scanning of a second random access memory device in predetermined correspondence with the movement of the display beam, thereby producing an output from the second memory device according to whether the area scanned in the second memory device has been previously scanned, and modulating the intensity of the display beam in response to a predetermined relationship between the outputs of the second memory device and the first-named memory device.

11. The method of claim 10 including the steps of programming one memory device to scan information corresponding to one viewing plane and programming the other memory device to scan information corresponding to another viewing plane.

12. The network of claim 5 including means to generate the signals corresponding to three-dimensional coordinates of the points according to a first sequence, means to generate the signals corresponding to three-dimensional coordinates of the points according to a second sequence, and means to automatically alternate actuation of the first and second sequencing means with alternate frames of display by the display device.

13. A network for generating signals for modulating the beam of a display device comprising means for generating signals corresponding to deflection voltages for the display device to control movement of the display beam according to a desired display, means for alternating the sequence of generation of signals between first and second sequences, means to transmit the deflection voltages to the display device, means actuated during each first sequence for simultaneously controlling the scanning of an overlap random access memory device and the scanning of an overlap storage device in correspondence with the transmission of deflection voltages and means to read stored shadow signal information from a shadow storage device in correspondence with the transmission of deflection voltages, means actuated during each second sequence for simultaneously controlling the scanning of a shadow random access memory device and the scanning of the shadow storage device in correspondence with the transmission of deflection voltages and means to read stored overlap signal information from the overlap storage device, means to modulate the intensity of the display beam as a function of the output from the overlap memory device and the reading of the stored shadow signals during each first sequence, and means to modulate the intensity of the display beam as a function of the output from the shadow memory device and the reading of the stored overlap signals during each second sequence.

14. The network of claim 13 wherein the random access memory devices comprise vidicon tubes.

References Cited

UNITED STATES PATENTS 3,364,382 1/1968 Harrison.

OTHER REFERENCES

Vlahos, P.: The Three Dimensional Display, Its Cues and Techniques, Information Display, pp. 10–20, November–December 1965.

RODNEY D. BENNETT, *Primary Examiner.*

T. H. TUBBESING, *Assistant Examiner.*

U.S. Cl. X.R.

315—22; 340—324